United States Patent
Suhara et al.

(10) Patent No.: US 7,270,797 B2
(45) Date of Patent: Sep. 18, 2007

(54) PROCESS FOR PRODUCING POSITIVE ELECTRODE ACTIVE MATERIAL FOR LITHIUM SECONDARY BATTERY

(75) Inventors: Manabu Suhara, Chigasaki (JP); Naoshi Saito, Chigasaki (JP); Kazushige Horichi, Chigasaki (JP); Koji Tatsumi, Chigasaki (JP)

(73) Assignee: Seimi Chemical Co., Ltd., Chigasaki-shi (JP)

( * ) Notice: Subject to any disclaimer, the term of this patent is extended or adjusted under 35 U.S.C. 154(b) by 38 days.

(21) Appl. No.: 11/128,198

(22) Filed: May 13, 2005

(65) Prior Publication Data
US 2005/0220701 A1    Oct. 6, 2005

Related U.S. Application Data

(63) Continuation of application No. PCT/JP04/04603, filed on Mar. 31, 2004.

(30) Foreign Application Priority Data

Mar. 31, 2003   (JP)   ............................ 2003-096739

(51) Int. Cl.
*C01D 1/02*   (2006.01)
*C01B 13/14*   (2006.01)
*H01M 4/58*   (2006.01)

(52) U.S. Cl. ............... 423/594.6; 423/594.2; 423/594.4; 423/594.8; 423/594.12; 423/594.15; 423/596; 423/598; 423/600; 429/231.3

(58) Field of Classification Search ............ 423/594.6, 423/594.5, 592.1, 593.1, 594.2, 594.4, 596, 423/594.15, 598, 600, 594.8, 594.12; 429/231.3
See application file for complete search history.

(56) References Cited

U.S. PATENT DOCUMENTS 6,617,073 B1 * 9/2003 Matsumoto et al. ..... 429/231.3
6,756,155 B1 * 6/2004 Kweon et al. ......... 429/231.95

FOREIGN PATENT DOCUMENTS

| JP | 11-292549 | 10/1999 |
|---|---|---|
| JP | 2001-291507 | 10/2001 |
| JP | 2002-321921 | 11/2002 |

* cited by examiner

*Primary Examiner*—Wayne A. Langel
*Assistant Examiner*—James Fiorito
(74) *Attorney, Agent, or Firm*—Oblon, Spivak, McClelland, Maier & Neustadt, P.C.

(57) ABSTRACT

To provide a process for producing a lithium-cobalt composite oxide for a positive electrode of a lithium secondary battery excellent in volume capacity density, safety, charge and discharge cyclic durability, press density and productivity, by using in expensive cobalt hydroxide and lithium carbonate. A mixture having a cobalt hydroxide powder and a lithium carbonate powder mixed so that the atomic ratio of lithium/cobalt would be from 0.98 to 1.01, is fired in an oxygen-containing atmosphere at from 250 to 700° C., and the fired product is further fired in an oxygen-containing atmosphere at from 850 to 1,050° C., or such a mixture is heated at a temperature-raising rate of at most 4° C./min in a range from 250 to 600° C. and fired in an oxygen-containing atmosphere at from 850 to 1,050° C.

8 Claims, No Drawings

PROCESS FOR PRODUCING POSITIVE ELECTRODE ACTIVE MATERIAL FOR LITHIUM SECONDARY BATTERY

BACKGROUND OF THE INVENTION

1. Field of the Invention

The present invention relates to a process for producing a lithium-cobalt composite oxide for a positive electrode of a lithium secondary battery, which has a large volume capacity density, high large current discharge properties, high safety, high charge and discharge cyclic durability, high press density and high productivity, by using cobalt hydroxide and lithium carbonate as inexpensive materials, a positive electrode for a lithium secondary battery containing the produced lithium-cobalt composite oxide, and a lithium secondary battery.

2. Discussion of Background

Recently, as the portability and cordless tendency of instruments have progressed, a demand for a non-aqueous electrolyte secondary battery such as a lithium secondary battery which is small in size and light in weight and has a high energy density, has been increasingly high. As a positive electrode active material for the non-aqueous electrolyte secondary battery, a composite oxide of lithium and a transition metal such as $LiCoO_2$, $LiNiO_2$, $LiNi_{0.8}Co_{0.2}O_2$, $LiMn_2O_4$ or $LiMnO_2$, has been known.

Among them, a lithium secondary battery using a lithium-cobalt composite oxide ($LiCoO_2$) as a positive electrode active material and using a lithium alloy or carbon such as graphite or carbon fiber as a negative electrode, can obtain a high voltage at a level of 4V, whereby it has been widely used as a battery having a high energy density.

As a method for producing a lithium-cobalt composite oxide, it is common to employ tricobalt tetroxide as the cobalt material and lithium carbonate as the lithium material. Further, a method of employing cobalt oxyhydroxide and lithium carbonate has been recently industrially employed. Such tricobalt tetroxide or cobalt oxyhydroxide is produced by oxidation of cobalt hydroxide. Cobalt hydroxide is inexpensive as a cobalt material, since it is the raw material for tricobalt tetroxide or cobalt oxyhydroxide.

JP-2002-321921 discloses a method for producing lithium cobaltate from cobalt hydroxide and lithium carbonate. In this JP-A-2002-321921, it is characterized that firstly a cobalt hydroxide powder and a lithium carbonate powder are mixed so that the molar ratio of Li/Co will be from 1.02 to 1.06, the mixture is granulated and subjected to primary firing at a temperature of from 600 to 700° C., and then, the fired product is pulverized, followed further by secondary firing at a temperature of from 750 to 1,000° C. However, the method disclosed in JP-A-2002-321921 includes steps of granulation of a raw material mixed powder prior to firing and pulverization after the primary firing and thus has a problem that the production process tends to be cumbersome, the production cost tends to be high, or the charge and discharge cyclic durability tends to be poor. Accordingly, it is unexpected even to those skilled in the art that it is possible to produce a lithium-cobalt composite oxide which has a particle size distribution desirable for a positive electrode of a lithium secondary battery and which will become a positive electrode having good performance, by using cobalt hydroxide as an inexpensive material.

SUMMARY OF THE INVENTION

It is an object of the present invention to provide a novel process for producing a lithium-cobalt composite oxide for a positive electrode of a lithium secondary battery having a large volume capacity density, high safety, large charge and discharge cyclic durability, high press density and high productivity, by using cobalt hydroxide and lithium carbonate which are, respectively, inexpensive materials as the cobalt source and the lithium source; a positive electrode for a lithium secondary battery, containing the produced lithium-cobalt composite oxide; and a lithium secondary battery.

The present inventors have continued a study to accomplish the above objects and a result, have found it possible to produce a lithium-cobalt composite oxide, by using inexpensive cobalt hydroxide as the cobalt source and using also inexpensive lithium carbonate as the lithium source, and firing a mixture obtained by mixing them in a specific blend ratio, under a specific controlled condition, without necessity to carry out granulation of the material or pulverization at an intermediate stage. Yet, the obtained lithium-cobalt composite oxide has been found to have excellent properties as a positive electrode of a lithium secondary battery with respect to each of the volume capacity density, safety, charge and discharge cyclic durability, press density and productivity.

The reason as to why the above objects can be accomplished by firing the above specific mixture of materials under the specific controlled condition according to the present invention, is not clearly understood. However, it is considered that as compared with cobalt oxide, cobalt hydroxide has a slow reactivity with lithium carbonate, and if the temperature-raising speed is too high, unreacted lithium carbonate is likely to fuse, thus leading to phase separation between cobalt and lithium, whereby lithium modification tends to be incomplete.

Thus, the present invention is essentially directed to the following constructions.

(1) A process for producing a lithium-cobalt composite oxide for a positive electrode of a lithium secondary battery, characterized in that a mixture having a cobalt hydroxide powder and a lithium carbonate powder mixed so that the atomic ratio of lithium/cobalt would be from 0.98 to 1.01, is fired in an oxygen-containing atmosphere at from 250 to 700° C., and the fired product is further fired in an oxygen-containing atmosphere at from 850 to 1,050° C.

(2) The process according to the above (1), wherein the fired product fired at from 250 to 700° C., is, without being pulverized, fired in the oxygen-containing atmosphere at from 850 to 1,050° C.

(3) A process for producing a lithium-cobalt composite oxide for a positive electrode of a lithium secondary battery, characterized in that a mixture having a cobalt hydroxide powder and a lithium carbonate powder mixed so that the atomic ratio of lithium/cobalt would be from 0.98 to 1.01, is heated at a temperature-raising rate of at most 4° C./min in a range of from 250 to 600° C. and fired in an oxygen-containing atmosphere at from 850 to 1,050° C.

(4) The process according to any one of the above (1) to (3), wherein in the X-ray diffraction spectrum using Cu—Kα-ray, of cobalt hydroxide, the half value width of the diffraction peak on (001) plane at 2θ=19±1° is from 0.18 to 0.35°, and the half value width of the diffraction peak on (101) plane at 2θ=38±1° is from 0.15 to 0.35°, and the specific surface area is from 5 to 50 m²/g.

(5) The process according to any one of the above (1) to (4), wherein the cobalt hydroxide powder is substantially spherical secondary particles having an average particle size D50 of from 5 to 25 μm, made of primary particles agglomerated.

(6) The process according to any one of the above (1) to (5), wherein the average particle size D50 after dispersing the secondary particles of cobalt hydroxide in pure water, is at most ¼ of the average particle size D50 before dispersing them in pure water.

(7) A positive electrode for a lithium secondary battery containing the lithium-cobalt composite oxide produced by the process as defined in any one of the above (1) to (6).

(8) A lithium secondary battery employing the positive electrode as defined in the above (7).

DETAILED DESCRIPTION OF THE PREFERRED EMBODIMENTS

The lithium-cobalt composite oxide $LiCoO_2$ for a positive electrode of a lithium secondary battery produced in the present invention may further contain element M. Element M is a transition metal element other than Co, or an alkaline earth metal. The transition metal element represents a transition metal of Group 4, Group 5, Group 6, Group 7, Group 8, Group 9, Group 10 or Group 11 of the Periodic Table. Among them, M is at least one element selected from the group consisting of Ti, Zr, Hf, V, Nb, Ta, Mg, Ca, Sr, Ba and Al. Among them, Ti, Zr, Hf, Mg or Al is preferred from the viewpoint of high capacity, the safety, the cyclic durability, etc.

Further, the lithium-cobalt composite oxide may further contain a fluorine atom F. In a case where the above M and/or F is contained in the lithium-cobalt composite oxide to be produced by the present invention, each of M and F is preferably present on the surface, or substantially on the surface i.e. preferably within 100 nm, particularly preferably within 30 nm from the surface, of the lithium cobaltate particles. If it is present in the interior of the particles, not only the effect of improving the battery characteristics tends to be small, but also the battery characteristics may decrease in some cases. By the presence of these elements on the surface, the important battery characteristics such as the safety or the charge and discharge cyclic properties can be improved by an addition of a small amount without bringing about the reduction of the battery performance. The presence of these elements on the surface can be judged by carrying out a spectroscopic analysis such as a XPS analysis with respect to the positive electrode particles.

Any one may be used as the cobalt hydroxide to be used for the production of the lithium-cobalt composite oxide of the present invention. However, it is particularly preferred to use one which has a half value width of the diffraction peak on (001) plane at $2\theta=19\pm1°$ of from 0.18 to 0.35° and a half value width of the diffraction peak on (101) plane at $2\theta=38\pm10$ of from 0.15 to 0.35°, as measured by the X-ray diffraction using $CuK\alpha$ as the ray source, and which has a specific surface area of from 5 to 50 $m^2/g$.

If the half value width of the diffraction peak on (001) phase at $2\theta=19\pm1°$ and the half value width of the diffraction peak of (101) plane at $2\theta=38\pm1°$, of the cobalt hydroxide, as measured by the X-ray diffraction using $CuK\alpha$ as the ray source, are outside the above ranges prescribed by the present invention, the powder tends to be bulky the press density of the positive electrode tends to be low, or the safety tends to be low. The above half value widths are particularly preferably such that the half value width of the diffraction peak on (001) plane at $2\theta=19\pm1'$ is from 0.22 to 0.300, and the half value width of the diffraction peak on (101) plane at $2\theta=38\pm1°$ is from 0.18 to 0.30°.

Further, if the specific surface area of the cobalt hydroxide is smaller than 5 $m^2/g$, the press density of the positive electrode tends to be low, and the safety tends to decrease. On the other hand, if it exceeds 50 $m^2/g$, the powder tends to be bulky. The specific surface area is particularly preferably from 10 to 30 $m^2/g$. Further, if the press density of the cobalt hydroxide is smaller than 1.0 $g/cm^3$, the powder tends to be bulky. On the other hand, if it exceeds 2.5 $g/cm^3$, the press density of the positive electrode tends to be low, such being undesirable.

Further, the press density of the cobalt hydroxide is preferably from 1.0 to 2.5 $g/cm^3$, particularly preferably from 1.3 to 2.2 $g/cm^3$. Here, the press density of cobalt hydroxide in the present invention is meant for an apparent press density when the particle powder is compressed by a press under a pressure of 0.3 $t/cm^2$, unless otherwise specified. Further, the press density of the lithium-cobalt composite oxide is meant for an apparent press density when it is compressed by a press under a pressure of 0.96 $t/cm^2$.

Further, the cobalt hydroxide powder has an average particle size D50 of preferably from 5 to 25 μm, particularly preferably from 8 to 20 μm, as formed by agglomeration of primary particles. If the above average particle size is not within the above range, the press density of the positive electrode tends to be low, or the large current discharge properties or self-discharge properties tend to be low, such being undesirable. Further, the average particle size D50 in a state where the secondary particles of the cobalt hydroxide powder is dispersed in water is preferably at most ¼, more preferably at most ⅛, of the average particle size D50 prior to being dispersed in water. In such a case, the measurement of the average particle size D50 in a state where the cobalt hydroxide particles are dispersed in water, is carried out under irradiation with ultrasonic waves (42 KHz, 40 W) for three minutes.

Further, the shape of the secondary particles of the cobalt hydroxide is preferably substantially spherical. The shape of particles being substantially spherical includes a spherical shape, a rugby ball shape, a polyhedral shape, etc., but the major axis/the minor axis is preferably from 2/1 to 1/1, particularly preferably from 1.5/1 to 1/1. Especially, the particles preferably have a shape as spherical as possible.

The cobalt hydroxide having the above-mentioned specific physical properties, to be used for the production of the lithium-cobalt composite oxide of the present invention, may be produced by various methods, and the production methods are not particularly limited. For example, an aqueous cobalt sulfate solution, an aqueous ammonium hydroxide solution and an aqueous sodium hydroxide solution may be continuously mixed, whereby a slurry containing cobalt hydroxide can easily be produced. And, by changing the reaction conditions such as the pH and stirring, at that time, it is possible to obtain the cobalt hydroxide having the physical properties of the present invention.

The present invention uses cobalt hydroxide having the above-mentioned specific physical properties as the cobalt source. However, a part of such cobalt hydroxide may be substituted by another cobalt source, whereby there may be a case where the balance of the battery properties or the positive electrode productivity can be improved. As such another cobalt source, cobalt oxyhydroxide or tricobalt tetroxide may, for example, be exemplified.

In a case where a lithium-cobalt composite oxide is to be produced by the present invention, as the lithium source, lithium carbonate is used which is an inexpensive lithium source, and in the present invention, even then, a lithium-cobalt composite oxide having excellent performance can be obtained. Further, as the material for element M to be used as the case requires, a hydroxide, an oxide, a carbonate or a fluoride may be selected for use. As the fluorine source, a metal fluoride, LiF or $MgF_2$ may, for example, be selected for use.

In the present invention, a mixture comprising the above cobalt hydroxide, lithium carbonate and the element M source and the fluorine source to be used as the case requires, is fired in an oxygen-containing atmosphere to obtain a lithium-cobalt composite oxide. In such a case, in order to obtain a lithium-cobalt composite oxide having excellent performance, the ratio of lithium to cobalt in the above mixture to be fired, is important, and lithium/cobalt is required to be from 0.98 to 1.01 by atomic ratio. If this ratio is smaller than 0.98, the amount of a by-product of cobalt oxide tends to be large, and when such a mixture is used for an electrode of a lithium battery, the discharge capacity tends to be low. On the other hand, if the above ratio is larger than 1.01, the charge and discharge cyclic durability tends to be low, and the mixture tends to be easily sintered, such being undesirable. It is particularly preferred that lithium/cobalt is from 0.990 to 1.005 by atomic ratio. Further, the firing condition of the above mixture to be fired is also important. In the present invention, as such a condition, firing is carried out by the following two step firing or one step firing. Namely, in the case of the two step firing, the above mixture is fired at a temperature of from 250 to 700° C., preferably from 300 to 550° C., and then, the fired product is fired at a temperature of from 850 to 1,050° C., preferably from 900 to 1,000° C. Whereas, in the case of the one step firing, the above mixture is heated at a temperature-raising rate of at most 4° C./min, preferably at most 3° C./min, in a range of from 250 to 600° C. and fired at a temperature of from 850 to 1,050° C., preferably from 900 to 1,000° C. When firing is carried out to satisfy either one of these conditions, a lithium-cobalt composite oxide having properties to satisfy the purpose of the present invention can be obtained without necessity to carry out granulation of the material or pulverization at an intermediate stage. Accordingly, if, for example, the above mixture is fired directly at a temperature of from 850 to 1,050° C. without carrying out the two step firing, or if the temperature is raised at a rate exceeding 4° C./min in the range of from 250 to 600° C., it is impossible to obtain a lithium-cobalt composite oxide having satisfactory performance, as will be shown by Comparative Examples given hereinafter.

In the present invention, under the above described firing condition, firing treatment is carried out for from 2 to 48 hours, preferably from 5 to 20 hours, and the obtained fired product is cooled, then pulverized and classified to obtain lithium-cobalt composite oxide particles.

The lithium-cobalt composite oxide thus produced will have an average particle size D50 of preferably from 5 to 15 μm, particularly preferably from 8 to 12 μm and a specific surface area of preferably from 0.3 to 0.7 $m^2/g$ particularly preferably from 0.4 to 0.6 $m^2/g$. The half value width of the diffraction peak on (110) plane at $2\theta=66.5\pm1°$ is preferably from 0.07 to 0.14°, particularly preferably from 0.08 to 0.12, as measured by the X-ray diffraction using CuKα as the ray source, and the press density is preferably from 3.15 to 3.8 $g/cm^3$, particularly preferably from 3.20 to 3.55 $g/cm^3$. Further, with the lithium-cobalt composite oxide of the present invention, the remaining alkali amount contained therein is preferably at most 0.03 wt %, particularly preferably at most 0.01 wt %.

To produce a positive electrode for a lithium secondary battery from such lithium-cobalt composite oxide, a carbon type conductive material such as acetylene black, graphite or Ketjenblack and a binding material are mixed with a powder of the composite oxide. As the binding material, preferably polyvinylidene fluoride, polytetrafluoroethylene, polyamide, carboxymethyl cellulose or an acrylic resin may, for example, be used.

The powder of the lithium-cobalt composite oxide of the present invention, the conductive material and the binding material are formed into a slurry or a kneaded product by using a solvent or a dispersion medium, which is then supported on a positive electrode current collector such as aluminum foil or stainless steel foil by e.g. coating to form a positive electrode for a lithium secondary battery.

In a lithium secondary battery using the lithium-cobalt composite oxide of the present invention as the positive electrode active material, as the separator, a porous polyethylene or a porous polypropylene film may be used. Further, as the solvent for the electrolyte solution of the battery, various solvents may be used. However, a carbonate ester is preferred. As the carbonate ester, each of a cyclic type and a chain type can be used. As the cyclic carbonate ester, propylene carbonate or ethylene carbonate (EC) may, for example, be mentioned. As the chain carbonate ester, dimethyl carbonate, diethyl carbonate (DEC), ethyl methyl carbonate (EMC), methyl propyl carbonate or methyl isopropyl carbonate may, for example, be mentioned.

In the present invention, the carbonate ester may be used alone or as a mixture of at least two types. Further, it may be used as mixed with another solvent. Further, according to the material of the negative electrode active material, if the chain carbonate ester is used together with the cyclic carbonate ester, there may be a case where the discharge properties, the cyclic durability or the charge and discharge efficiency can be improved.

Further, in the lithium secondary battery using the lithium-cobalt composite oxide of the present invention as the positive electrode active material, a gel polymer electrolyte containing a vinylidene fluoride-hexafluoropropylene copolymer (for example, KYNAR manufactured by ELF Atochem) or a vinylidene fluoride-perfluoropropyl vinyl ether copolymer may be employed. As the solute to be added to the electrolyte solvent or the polymer electrolyte, at least one member of lithium salts is preferably used, wherein e.g. $ClO_4—$, $CF_3SO_3—$, $BF_4—$, $PF_6—$, $AsF_6—$, $SbF_6—$, $CF_3CO_2—$ or $(CF_3SO_2)_2N—$ is anion. It is preferably added at a concentration of from 0.2 to 2.0 mol/L (liter) to the electrolyte solvent or the polymer electrolyte comprising the lithium salt. If the concentration departs from this range, ionic conductivity will decrease, and the electrical conductivity of the electrolyte will decrease. More preferably, it is from 0.5 to 1.5 mol/L.

In the lithium battery using the lithium-cobalt composite oxide of the present invention as the positive electrode active material, as the negative electrode active material, a material which can occlude and discharge lithium ions may be used. The material forming the negative electrode active material is not particularly limited, however, lithium metal, a lithium alloy, a carbon material, an oxide comprising, as a main body, a metal of Group 14 or Group 15 of the Periodic Table, a carbon compound, a silicon carbide compound, a silicone oxide compound, titanium sulfide or a boron carbide compound may, for example, be mentioned. As the carbon material, an organic material which is subjected to thermal decomposition under various thermal decomposition conditions, artificial graphite, natural graphite, soil graphite, exfoliated graphite or squamation graphite etc. can be used. Further, as the oxide, a compound comprising tin oxide as a main body can be used. As the negative electrode current collector, a copper foil, a nickel foil etc. can be used. The negative electrode is produced preferably by kneading the active material with an organic solvent to form a slurry, which is coated on the metal foil current collector, dried and pressed.

The shape of the lithium battery using the lithium-cobalt composite oxide of the present invention as the positive electrode active material is not particularly limited. Sheet, film, folding, winding type cylinder with bottom or button shape, may, for example, be selected for use depending upon the particular application.

EXAMPLES

Now, the present invention will be explained in further detail with reference to Examples. However, the present invention is by no means restricted to such specific Examples. Examples 1 to 6 are Examples of the present invention, and Examples 7 to 10 are Comparative Examples.

Example 1

A mixed liquid of an aqueous cobalt sulfate solution and ammonium hydroxide, was continuously mixed with an aqueous sodium hydroxide solution to continuously prepare a cobalt hydroxide slurry by a known method, and via agglomeration, filtration and drying steps, a cobalt hydroxide powder was obtained. The obtained cobalt hydroxide had a half value width of the diffraction peak on (001) plane at $2\theta=19\pm1°$ of 0.270 and a half value width of the diffraction peak on (101) plane at $2\theta=38\pm1°$ of 0.23°, by the powder X-ray diffraction using CuKα-ray (using RINT2100 model, manufactured by Rigaku Corporation, 40 KV-40 mA, sampling interval 0.020, scanning speed 2°/min, the same applies in the following Examples). Further, as a result of the scanning electron microscopic observation, it was found that the product was composed of substantially spherical secondary particles formed by agglomeration of fine particles of no specific shape. As a result of the volume based particle size distribution analysis, as obtained from the analysis of the image as observed by the scanning electron microscope, the average particle size D50 was 17.5 μm, D10 was 7.1 μm, and D90 was 26.4 μm.

Such secondary particles of the cobalt hydroxide were dispersed in pure water, whereby the secondary particles were easily disintegrated to form a suspension composed mainly of primary particles, whereby the cohesive force of the secondary particles was found to be weak. Further, the particle size distribution of such a secondary particle powder was measured by means of a laser scattering system particle size distribution measuring apparatus by using water as a dispersant after irradiation with ultrasonic waves (42 kHz, 40 W) for 3 minutes, whereby the average particle size D50 was 0.75 μm, D10 was 0.35 μm and D90 was 1.6 μm. Further, the slurry after the measurement of the average particle size was dried and observed by a scanning electron microscope, whereby the shape of secondary particles before the measurement was not observed. The specific surface area of the cobalt hydroxide particles composed of secondary particles was 17.1 m²/g, and the press density was 1.75 g/cm³, and the product was a substantially spherical cobalt hydroxide powder wherein primary particles were weakly agglomerated.

The above cobalt hydroxide powder and a lithium carbonate powder were dry-blended so that the atomic ratio (Li/Co) of lithium to cobalt was 1.000. This mixed powder was filled into a ceramic angular open container and heated at a rate of 1.2° C./min from room temperature to 600° C. in a firing furnace. Further, it was heated at a rate of 1.5° C./min from 600° C. to 950° C. and then continuously fired at 950° C. for 12 hours. The fired product had a homogeneous finish. The fired product was disintegrated, and the particle size distribution of the obtained $LiCoO_2$ powder formed by agglomeration of primary particles, was measured by means of a laser scattering type particle size distribution measuring apparatus using water as a dispersant, whereby the average particle size D50 was 9.5 μm, D10 was 4.9 μm, and D90 was 22.9 μm. Further, the specific surface area obtained by the BET method was 0.47 m²/g. The amount of a by-product of cobalt oxide was at most 0.2%.

10 g of the above $LiCoO_2$ powder was dispersed in 100 g of pure water, and after filtration, potentiometric titration was carried out with 0.1 N HCl to obtain the remaining alkali amount, which was found to be 0.02 wt %. Further, with respect to such a powder, the X-ray diffraction spectrum was obtained by the X-ray diffraction. In the powder X-ray diffraction using CuKα-ray, the half value width of the diffraction peak on (110) plane at $2\theta=66.5\pm1'$ was 0.095°, and the press density was 3.40 g/cm³.

The above powder, acetylene black and a polyvinylidene fluoride powder were mixed in a mass ratio of 90/5/5, and N-methylpyrrolidone was added to prepare a slurry, which was applied on one side of an aluminum foil having a thickness of 20 μm by means of a doctor blade. It was dried and rolled four times by a roll press to obtain a positive electrode sheet for a lithium battery.

The density of the electrode layer was determined from the thickness of the positive electrode after rolling and the weight per unit volume of the electrode layer and found to be 3.45 g/cm³.

Then, using one punched out from the positive electrode body sheet as a positive electrode, using a metal lithium foil with a thickness of 500 μm as a negative electrode, using a nickel foil of 20 μm as a negative electrode current collector, using a porous polypropylene with a thickness of 25 μm as a separator, and using as an electrolyte solution a 1M $LiPF_6$/EC+DEC (1:1) solution (it means a mixed solution of EC and DEC in a mass ratio (1:1) comprising $LiPF_6$ as a solute, the same applies hereinafter), two simple sealed cell type lithium batteries made of stainless steel were assembled in an argon globe box.

One of these batteries employing the EC+DEC (1:1) solution as the electrolyte solution was charged up to 4.3 V at a load current of 75 mA per 1 g of the positive electrode active material at 25° C., and discharged down to 2.5 V at a load current of 75 mA per 1 g of the positive electrode active material, whereby the initial discharge capacity was obtained. Also, the discharge capacity ratio of 1.5 C to 0.25 C was obtained. Further, the volume capacity density was obtained from the density of the electrode layer and the capacity per weight. With respect to this battery, the charge and discharge cycle test was further carried out 30 times. As a result, the initial volume capacity density of the positive electrode layer at 25° C. at a voltage of from 2.5 to 4.3 V was 497 mAh/cm³ electrode layer, the initial weight capacity density was 160 mAh/g-$LiCoO_2$, and the capacity retention after 30 times of charge and discharge cycle, was 97.2%.

Further, the ratio of the discharge capacity at 1.5 C/the discharge capacity at 0.25 C was 0.91.

Further, with respect to the other battery employing the EC+DEC (1:1) solution as the electrolyte solution, the other battery was charged for 10 hours at 4.3 V, and then disassembled in the argon globe box. The positive electrode body sheet after charging was taken out, and after the positive electrode body sheet was washed, it was punched out with a diameter of 3 mm, and then sealed in an aluminum capsule with EC. And then, it was heated at a rate of 5° C./min by using a scanning differential calorimeter, whereby the heat generation starting temperature was measured. As a result, the heat generation starting temperature of the 4.3 V charged product was 161° C.

Example 2

Using the same mixed powder as in Example 1, firstly, the temperature was raised from room temperature to 480° C. at a rate of 7° C./min, and then, the first stage firing was carried out at 480° C. for 5 hours in the atmosphere. Then, $LiCoO_2$ powder was prepared in the same manner as in Example 1 except that without carrying out and crushing, the temperature was raised in that state to 950° C. at a rate of 7° C./min, and then the second stage firing was carried out at 950° C. for 14 hours in the atmosphere. The fired product had a uniform finish. The obtained $LiCoO_2$ had an average particle size D50 of 9.7 μm, D10 of 4.0 μm and D90 of 20.1 μm, and the specific surface area obtained by the BET method was 0.48 m²/g.

With respect to the above powder, the X-ray diffraction spectrum was obtained by the X-ray diffraction. In the powder X-ray diffraction using CuKα-ray, the half value width of the diffraction peak on (110) plane at 2θ=66.5±1° was 0.098°. The press density of the powder was 3.45 g/cm³, and the remaining alkali amount was 0.02 wt %.

In the same manner as in Example 1, a positive electrode sheet was prepared by using the above powder, and the properties as the positive electrode active material for a lithium secondary battery were obtained, whereby the initial weight capacity density at 25° C. at a voltage of from 2.5 to 4.3 V was 161 mAh/g-$LiCoO_2$, and the capacity retention after 30 times of charge and discharge cycle was 97.1%. Further, the ratio of the discharge capacity at 1.5 C/the discharge capacity at 0.25 C was 0.90, and the heat generation starting temperature of the 4.3 V charged product was 162° C.

Example 3

A $LiCoO_2$ powder was prepared in the same manner as in Example 2 except that in Example 2, the firing temperature at the first stage was changed to 380° C. The fired product had a uniform finish. The obtained $LiCoO_2$ had an average particle size D50 of 10.2 μm, D10 of 6.0 μm and D90 of 24.6 μm, and the specific surface area obtained by the BET method was 0.52 m²/g.

With respect to the $LiCoO_2$ powder, the X-ray diffraction spectrum was obtained by using an X-ray diffraction apparatus (RINT2100 model, manufactured by Rigaku Corporation). In the powder X-ray diffraction using CuKα-ray, the half value width of the diffraction peak on (110) plane at 2θ=66.5±1° was 0.099°. The obtained $LiCoO_2$ powder had a press density of 3.43 g/cm³, as pressed under a pressure of 0.96 t/cm2 by a press. The remaining alkali amount of $LiCoO_2$ was 0.02 wt %.

In the same manner as in Example 1, a positive electrode sheet was prepared by using the above powder, and the properties as the positive electrode active material of a lithium secondary battery were obtained, whereby the initial weight capacity density at 25° C. at a voltage of from 2.5 to 4.3 V was 163 mAh/g-$LiCoO_2$, and the capacity retention after 30 times of charge and discharge cycle, was 98.0%. Further, the heat generation starting temperature of the 4.3 V charged product was 160° C.

Example 4

A $LiCoO_2$ powder was prepared in the same manner as in Example 1 except that in Example 1, the temperature-raising rate from room temperature to 600° C. was changed to 0.7° C./min and after raising the temperature to 950° C. at a temperature-raising rate of 1.5° C./min, firing was carried out at 950° C. for 12 hours. The obtained $LiCoO_2$ had an average particle size D50 of 9.7 μm, D10 of 3.7 μm and D90 of 21.5 μm, and the specific surface area obtained by the BET method was 0.74 m²/g.

With respect to the $LiCoO_2$ powder, the X-ray diffraction spectrum was obtained by the X-ray diffraction. In the powder X-ray diffraction using CuKα-ray, the half value width of the diffraction peak on (110) plane at 2θ=66.5±1°, was 0.095°. The obtained $LiCoO_2$ powder had a press density of 3.47 g/cm³, as pressed under a pressure of 0.96 t/cm2 by a press. The remaining alkali amount of $LiCoO_2$ was 0.02 wt %.

In the same manner as in Example 1, a positive electrode sheet was prepared by using the above powder, and the properties as the positive electrode active material of a lithium secondary battery were obtained, whereby the initial weight capacity density at 25° C. at a voltage of from 2.5 to 4.3 V was 161 mAh/g-$LiCoO_2$, and the capacity retention after 30 times of charge and discharge cycle, was 97.4%. Further, the heat generation starting temperature of the 4.3 V charged product was 161° C.

Example 5

A Positive electrode active material was prepared by firing under the same conditions as in Example 2 except that in Example 2, as the cobalt source, the cobalt hydroxide as used in Example 1 and cobalt oxyhydroxide having a secondary particle size of 15 μm, formed by agglomeration of primary particles, were used in equal mols by cobalt atomic ratio. The fired state of the fired powder in a firing container was uniform. The obtained $LiCoO_2$ had an average particle size D50 of 10.8 μm, D10 of 3.0 μm and D90 of 18.5 μm, and the specific surface area obtained by the BET method was 0.47 m²/g.

With respect to the $LiCoO_2$ powder, the X-ray diffraction spectrum was obtained by using an X-ray diffraction apparatus (RINT2100 model, manufactured by Rigaku Corporation). In the powder X-ray diffraction using CuKα-ray, the half value width of the diffraction peak on (110) plane at 2θ=66.5±1°, was 0.095°. The obtained $LiCoO_2$ powder had a press density of 3.30 g/cm³, as pressed under a pressure of 0.96 t/cm² by a press. The remaining alkali amount of $LiCoO_2$ was 0.02 wt %.

In the same manner as in Example 1, a positive electrode sheet was prepared by using the above powder, and the properties as the positive electrode active material of a lithium secondary battery were obtained, whereby the initial weight capacity density at 25° C. at a voltage of from 2.5 to 4.3 V was 161 mAh/g-$LiCoO_2$, and the capacity retention after 30 times of charge and discharge cycle, was 97.4%. Further, the heat generation starting temperature of the 4.3 V charged product was 163° C.

Example 6

A positive electrode active material was prepared by firing under the same conditions as in Example 2 except that in Example 2, as the cobalt source, the cobalt hydroxide as used in Example 1 and tricobalt tetroxide having a secondary particle size of 7 µm, formed by agglomeration of primary particles, were mixed in equal mols by cobalt atomic ratio. The fired state of the fired powder in the firing container was uniform. The obtained $LiCoO_2$ had an average particle size D50 of 7.7 µm, D10 of 3.0 µm, and D90 of 19.1 µm, and the specific surface area obtained by the BET method was 0.47 $m^2/g$.

With respect to the $LiCoO_2$ powder, the X-ray diffraction spectrum was obtained by the X-ray diffraction. In the powder X-ray diffraction using CuKα-ray, the half value width of the diffraction peak of (110) plane at 2θ=66.5±1', was 0.095°. The obtained $LiCoO_2$ had a press density of 3.20 $g/cm^3$, as pressed under a pressure of 0.96 $t/cm^2$ by a press. The remaining alkali amount of $LiCoO_2$ was 0.02 wt %.

In the same manner as in Example 1, a positive electrode sheet was prepared by using the above powder, and the properties as the positive electrode active material of a lithium secondary battery were obtained, whereby the initial weight capacity density at 25° C. at a voltage of from 2.5 to 4.3 V was 161 mAh/g-$LiCoO_2$, and the capacity retention after 30 times of charge and discharge cycle, was 97.4%. Further, the heat generation starting temperature was of the 4.3 V charged product was 160° C.

Example 7

$LiCoO_2$ was prepared by firing at 950° C. for 12 hours in the same manner as in Example 1 except that in Example 1, the temperature-raising rate from room temperature to 950° C. was changed to 6° C./min. The fired state of the fired powder in the firing container was non-uniform. The fired powder at the lower layer portion of the fired powder in the container was sintered, and the upper layer portion was not sintered, but the atomic ratio Li/Co of the lithium to cobalt in the fired powder was less than 1. The initial weight capacity density was 154 mAh/g-$LiCoO_2$, and the ratio of the discharge capacity at 1.5 C/the discharge capacity at 0.2 C was 0.75.

Example 8

$LiCoO_2$ was prepared in the same manner as in Example 2 except that in Example 2, the firing temperature in the first stage was changed to 800° C., and the firing in the second stage was carried out at 950° C. for 12 fours. The fired state of the fired powder in the firing container was non-uniform. The fired powder at the lower layer portion of the fired powder in the container was sintered, and the upper layer portion was not sintered, but the atomic ratio Li/Co of the lithium to cobalt in the fired powder was less than 1. The initial weight capacity density was 153 mAh/g-$LiCoO_2$, and the ratio of the discharge capacity at 1.5 C/the discharge capacity at 0.25 C was 0.78.

Example 9

$LiCoO_2$ was prepared in the same manner as in Example 2 except that in Example 2, the firing temperature in the first stage was changed to 200° C., and the firing in the second stage was carried out at 950° C. for 12 hours. The fired state of the fired powder in the firing container was non-uniform. The fired powder at the lower layer portion of the fired powder in the container was sintered, and the upper layer portion was not sintered, but the atomic ratio Li/Co of lithium to cobalt in the fired powder was less than 1. The initial weight capacity was 155 mAh/g-$LiCoO_2$, and the ratio of the discharge capacity at 1.5 C/the discharge capacity at 0.25 C was 0.82.

Example 10

A $LiCoO_2$ powder was prepared and evaluated in the same manner as in Example 2 except that in Example 2, the mixed atomic ratio of lithium/cobalt in the raw material was 1.025, whereby the capacity retention after 30 times of charge and discharge cycle was 89%.

INDUSTRIAL APPLICABILITY

The present invention provides a novel process for producing a lithium-cobalt composite oxide for a positive electrode of a lithium secondary battery having a large volume capacity density, high large current discharge properties, high safety, large charge and discharge cycle durability, high press density and high productivity, by using inexpensive cobalt hydroxide as the cobalt source and using also inexpensive lithium carbonate as the lithium source. Further, the present invention provides a positive electrode for a lithium secondary battery, containing the produced lithium-cobalt composite oxide, and a lithium secondary battery.

The entire disclosure of Japanese Patent Application No. 2003-096739 filed on Mar. 31, 2003 including specification, claims and summary is incorporated herein by reference in its entirety.

What is claimed is:

1. A process for producing a lithium-cobalt composite oxide for a positive electrode of a lithium secondary battery, comprising:
   forming a mixture of a cobalt hydroxide powder and a lithium carbonate powder so that an atomic ratio of lithium to cobalt is from 0.98 to 1.01;
   firing the mixture in an oxygen-containing atmosphere at a temperature of from 250 to 550° C. to obtain a fired product; and
   further firing the fired product in an oxygen-containing atmosphere at a temperature of from 850 to 1,050° C.;
   wherein the fired product is further fired without being pulverized.

2. The process according to claim 1, wherein:
   in an X-ray diffraction spectrum of the cobalt hydroxide powder using Cu-Kα-ray, a half value width of a diffraction peak on (001)plane at 2θ=19±1° is from 0.18 to 0.35°, and a half value width of a diffraction peak on (101)plane at 2θ=38±1° is from 0.15 to 0.35°; and
   the cobalt hydroxide powder has a specific surface area of from 5 to 50 $m^2/g$.

3. The process according to claim 1, wherein:
   the cobalt hydroxide powder comprises substantially spherical secondary particles formed from agglomerated primary particles; and
   the secondary particles have an average particle size D50 of from 5 to 25 µm.

4. The process according to claim 1, wherein:
the cobalt hydroxide powder comprises secondary particles formed from agglomerated primary particles;
the secondary particles have a first average particle size D50 before being dispersed in pure water and a second average particle size D50 after being dispersed in pure water; and
the second average particle size D50 is at most ¼ of the first average particle size D50.

5. The process according to claim 1, wherein further firing the fired product comprises firing at a temperature of from 900 to 1,050° C.

6. The process according to claim 1, wherein further firing the fired product comprises firing at a temperature of from 950 to 1,050° C.

7. A process for producing a lithium-cobalt composite oxide for a positive electrode of a lithium secondary battery, comprising:
forming a mixture of a cobalt hydroxide powder and a lithium carbonate powder so that an atomic ratio of lithium to cobalt is from 0.98 to 1.01;
heating the mixture through a temperature range of from 250 to 600° C. at a rate of 4° C./min or less; and
firing the heated mixture in an oxygen-containing atmosphere at a temperature of from 850 to 1,050° C.

8. A process for producing a lithium-cobalt composite oxide for a positive electrode of a lithium secondary battery, comprising:
forming a mixture of a cobalt hydroxide powder and a lithium carbonate powder so that an atomic ratio of lithium to cobalt is from 0.98 to 1.005;
firing the mixture in an oxygen-containing atmosphere at a temperature of from 250 to 550° C. to obtain a fired product; and
further firing the fired product in an oxygen-containing atmosphere at a temperature of from 850 to 1,050° C.;
wherein the fired product is further fired without being pulverized.

* * * * *